Patented Aug. 12, 1947

2,425,426

UNITED STATES PATENT OFFICE 2,425,426

POLYHALOGENO ALIPHATIC NITRILES

Robert M. Joyce, Jr., Marshallton, Del., assignor to E. I. du Pont de Nemours & Company, Wilmington, Del., a corporation of Delaware No Drawing. Application December 18, 1943, Serial No. 514,820

5 Claims. (Cl. 260—464)

This invention relates to new compositions of matter and is particularly directed to omega-polyhalogeno aliphatic compounds of the type

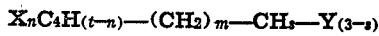

in which the terminal valencies $X$ are satisfied by halogen; the terminal valencies $Y$ are satisfied by at least one polyvalent element more negative than selenium in the displacement series (Hackh's Chemical Dictionary, 2d edition, p. 315); $n$ is 2 or 3; $t$ is 7 or 9; $m$ is an integer less than 12; and $s$ is an integer less than 3.

This invention is in part a continuation of my copending application Serial No. 444,113, filed May 22, 1942.

The omega-polyhalogeno aliphatic compounds responding to this formula are potentially cheap and easily prepared and are particularly adapted for use in pest control as fungicides and insecticides, but have a wider range of applicability as adjuvants for lubricating oils, plasticizers and as intermediates for the preparation of dyes and pharmaceuticals.

The compounds of the invention may be prepared from omega-polyhalogeno aliphatic halides of Hanford & Joyce application Serial No. 438,466 and Peterson application Serial No. 438,458, filed April 10, 1942, by replacement of the alpha halogen with a suitable group containing one or more polyvalent elements more negative than selenium in the displacement series so as to provide with the alpha carbon atom or with an added carbon atom a $-CH_s-Y_{(3-s)}$ group. This group is characterized in that all the valencies of the terminal carbon atom which are not satisfied by hydrogen are satisfied by an element or elements which are polyvalent and more negative than selenium in the displacement series.

The group $-CH_s-Y_{(3-s)}$ may characterize the compound as an acid, salt, ester, ether or anhydride, or as an amine, amide, imine or ammonium compound, or as an alcohol, alcoholate, mercaptan or mercaptide, and includes such groupings as $-CH_2OR$, $-CH_2SR$, $-CH_2SCN$, $-CH_2O.O:CR$, $-CH_2S.S:CR$, $-CH_2O.S:CR$, $-CH_2S.O:CR$, $-CH_2SO_3R$, $-CH_2SO_2R$, $-C:O.OR$, $-C:S.SR$, $-C:O.SR$, $-C:S.OR$, $-CN$, $-CHN:R$, $-CH_2NR_1R_2$, $-CH_2NR_1R_2R_3X$, etc. Thus the group $-CH_s-Y_{(3-s)}$ includes such diverse groups as

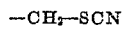

$s=2$

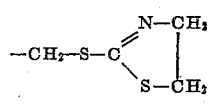

$s=2$

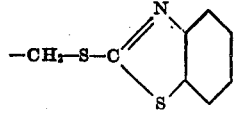

$s=2$

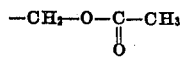

$s=2$

—CH₂—CN $s=2$

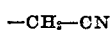

$s=2$

—CH₂OH $s=2$

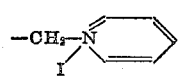

$s=2$

$s=2$

—CH₂—S—CH₂—(monosulfide)

$s=2$

—CH₂—S—S—S—CH₂—(polysulfide)

$s=2$

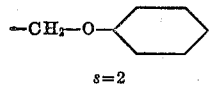

$s=2$

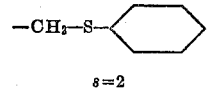

$s=2$

—CH₂SH $s=2$

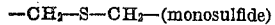

$s=2$

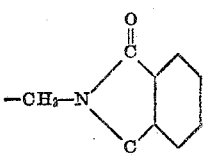

$s=2$

—CH₂—O—C₁₂H₂₅

$s=2$

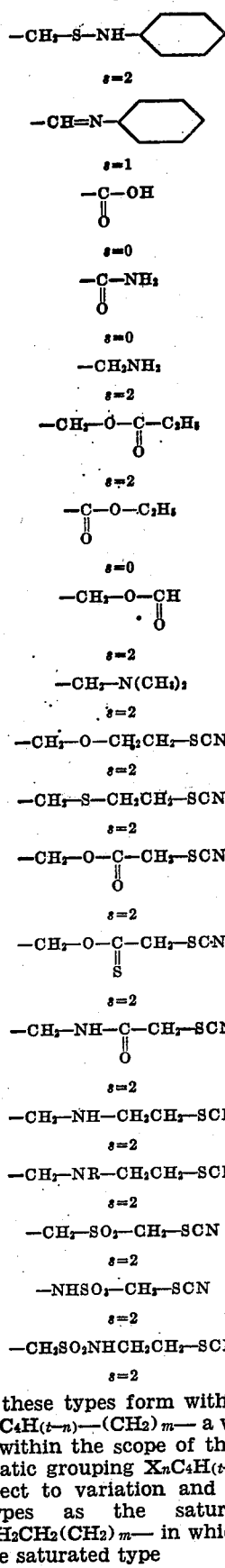

$X_3C$—$CH_2CH$=$CH$—$(CH_2)_m$— in which $t$ is 7 and $n$ is 3 and the unsaturated type $$X_2C=CH—CH_2CH_2—(CH_2)_m—$$

in which $t$ is 7 and $n$ is 2. The value of $m$ may be as great as 11 and it is preferred that it be not more than 5. Thus the aliphatic grouping may include such radicals as the following:

| | | | |
|---|---|---|---|
| $Cl_3C(CH_2)_3$— | $X=Cl$; | $m=0$; | $t=9$; $n=3$ |
| $Cl_3C(CH_2)_5$— | $X=Cl$; | $m=2$; | $t=9$; $n=3$ |
| $Cl_3C(CH_2)_7$— | $X=Cl$; | $m=4$; | $t=9$; $n=3$ |
| $Br_3C(CH_2)_3$— | $X=Br$; | $m=0$; | $t=9$; $n=3$ |
| $F_3C(CH_2)_5$— | $X=F$; | $m=2$; | $t=9$; $n=3$ |
| $I_3C(CH_2)_7$— | $X=I$; | $m=4$; | $t=9$; $n=3$ |
| $Cl_2CH(CH_2)_4$— | $X=Cl$; | $m=1$; | $t=9$; $n=2$ |
| $Cl_2CH(CH_2)_3$— | $X=Cl$; | $m=0$; | $t=9$; $n=2$ |
| $Br_2CH(CH_2)_3$— | $X=Br$; | $m=0$; | $t=9$; $n=2$ |
| $Cl_3CCH_2CH:CH$— | $X=Cl$; | $m=0$; | $t=7$; $n=3$ |
| $Br_3CCH_2CH:CH$— | $X=Br$; | $m=0$; | $t=7$; $n=3$ |
| $Cl_3CCH_2CH:CH—CH_2$— | $X=Cl$; | $m=1$; | $t=7$; $n=3$ |
| $Cl_3CCH_2CH:CHCH_2CH_2$— | $X=Cl$; | $m=2$; | $t=7$; $n=3$ |
| $Cl_2C:CH(CH_2)_2$— | $X=Cl$; | $m=0$; | $t=7$; $n=2$ |
| $Cl_2C:CH(CH_2)_3$— | $X=Cl$; | $m=1$; | $t=7$; $n=2$ |
| $Br_2C:CH(CH_2)_2$— | $X=Br$; | $m=0$; | $t=7$; $n=2$ |

By suitable choice of the group —$CH_3$—$Y_{(3-s)}$ and suitable selection of the aliphatic grouping $X_nC_4H_{(t-n)}$—$(CH_2)_m$— there may be obtained a wide variety of compounds within the scope of the invention. The following examples are illustrative of methods of preparing such compounds. The parts are by weight unless otherwise specified.

EXAMPLE 1

1-thiocyano-5,5,5-trichlorononane

A mixture of 40 g. of 1,9,9,9-tetrachlorononane, 17.5 g. of potassium thiocyanate and 100 cc. of n-butyl alcohol was refluxed with stirring for 4 hours. After removal of the precipitated potassium chloride by filtration, the reaction solvent was distilled from the filtrate and the residue taken up in ether. This ether solution was washed with water until washing gave a negative test for thiocyanate ion. The ether solution was then dried over sodium sulfate. After removal of the drying agent and evaporation of the ether, the residual oil was distilled and the fraction boiling at 161–164° C./3 mm. amounted to 32.8 g. This colorless, oily fraction on analysis for nitrogen showed a content of 4.95%, as compared to a calculated value of 4.85% for this element.

By a similar procedure substituting the appropriate omega-polyhalogeno aliphatic compound there may be prepared other thiocyanates such as 1-thiocyano-5,5,5-trichloropentane, 1-thiocyano-7,7,7-trichloroheptane, 1-thiocyano - 5,5 - dichloropentene-5 and 1-thiocyano-5,5,5-trifluoropentane.

By a similar procedure substituting sodium hydrosulfide for potassium triocyanate, omega-polyhalogeno-aliphatic mercaptans can be prepared.

EXAMPLE 2

2-(5,5,5-trichloropentylthio)-2-thiazoline

A mixture comprising 28.2 g. of the sodium salt of 2-mercaptothiazoline, 150 cc. of butanol, and 42 g. of 1,1,1,5-tetrachloropentane, is refluxed with stirring for seven hours. The reaction mixture is poured into water and made alkaline to litmus with sodium hydroxide. The oil is separated with ether, washed with 5% sodium hydroxide solution, and finally washed neutral with water. After drying over sodium sulfate, the solvent is removed by heating up to 150° C./3 mm. The yield is 52 g. (89% of theory) of straw-colored oil which contains by analysis 21.54% sulfur and 36.76% chlorine. The calculated values are 21.85% and 36.40% for sulfur and chlorine, respectively.

By a similar procedure substituting the appropriate omega-polyhalogeno aliphatic compound there may be prepared other derivatives of 2-thiazoline such as 2(9,9,9-trichlorononylthio)-2-thiazoline and 2(5,5,5-trichloro-2-pentenylthio)-2-thiazoline.

EXAMPLE 3

5,5,5-trichloroamyl acetate

A mixture comprising 53 g. of 1,1,1,5-tetrachloropentane, 150 cc. of glacial acetic acid, and 60 g. of fused sodium acetate is refluxed for 20 hours. After distilling off the greater part of the excess acetic acid the residue is taken up with water and extracted with carbon tetrachloride. The extract is washed with sodium carbonate solution, water, saturated calcium chloride solution, and dried. Distillation of the product yields 57.7 g. of crude ester boiling at 133–135°/21 mm. On redistillation through a precision still, approximately 40 g. of 5,5,5-trichloroamyl acetate may be obtained boiling at 135°/15 mm. This product has a refractive index of $n_D^{26}$ 1.4643 and contains by analysis 45.79% chlorine as compared with the calculated value of 45.61.

By a similar procedure substituting the appropriate omega-polyhalogeno aliphatic compound there may be prepared other acetates such as, for example, 5,5,5-trichloro-2-pentenyl, 9,9,9-trichlorononyl, and 5 5-dichloroamyl acetates. Also, by similar procedure, substituting the appropriate salts there may be produced other esters such as the formate, propionate, laurate, oleate, stearate and benzoate.

EXAMPLE 4

6,6,6-trichlorocapronitrile

A mixture comprising 105 g. of 1,1,1,5-tetrachloropentane, 105 g. of n-propanol, and 31 g. of sodium cyanide dissolved in 35 cc. of water is refluxed with stirring for 21 hours. After cooling the reaction mixture, ethyl acetate is added and the precipitated salt filtered off. The solvents are then distilled off and the residue is taken up in carbon tetrachloride, dried and distilled. A yield of 44 g. (44%) of 6,6,6-trichlorocapronitrile is obtained, together with 46.3 g. of unchanged 1,1,1,5-tetrachloropentane. This represents a conversion of 92%. The nitrile distills at 111–113°/2 mm. and has a refractive index of $n_D^{28}$ 1.4799.

By a similar procedure using an appropriate omega-polyhalogeno aliphatic compound there may be prepared additional nitriles such as 5,5,5-trichloro-2-pentenyl cyanide and 5,5-dichloro-4-pentenyl cyanide.

By subjecting the nitrile to hydrolysis there may be prepared the corresponding acid which may be esterified or amidated as desired. There may thus be produced such compounds as 6,6,6-trichlorocaproic acid, 6,6-dichlorocaproic acid amide and ethyl-7,7,7-trichloro-4-heptenoate. The nitriles also may be hydrogenated, 6,6-dichlorohexene-5-oic nitrile, for example, giving 6,6-dichlorohexylamine.

EXAMPLE 5

5,5,5-trichloropentanol

Forty-two grams of 1,1,1,5-tetrachloropentane, 20.2 g. of potassium formate, 2 g. of sodium iodide, and 150 cc. of methanol is heated at 100° C. for 18 hours in a pressure bottle. The reaction mixture is poured into water and the oil separated with ether. The ether layer is then extracted with water, dried over sodium sulfate, and vacuum distilled. The product distilling at 61–2°/3 mm. is fractionated through a precision still, yielding 17 g. of an oil boiling at 131–2°/25 mm. (44% of theory). This contains by analysis 55.75% chlorine as compared to the calculated value of 55.60.

By a similar procedure substituting the omega-polyhalogeno aliphatic compound there may be prepared alcohols of any of the aliphatic groupings listed above such as, for example, 5,5-dibromoamyl alcohol, 9,9,9-trichloro-nonyl alcohol, and 5,5,5-trichloro-2-pentenyl alcohol. By appropriate procedure these alcohols also may be converted into amines, esters, ethers, though in some cases it may be more simple to proceed directly with the primary omega-polyhalogeno aliphatic compound.

EXAMPLE 6

Phenyl 5,5,5-trichloropentyl ether

A solution of 4.6 g. of sodium dissolved in 150 cc. of dry butanol is added to a mixture of 42 g. of 1,1,1,5-tetrachloropentane and 18.8 g. of phenol and refluxed with stirring for two hours. The reaction mixture is poured into water, the oil separated with ether, and the ether layer extracted with 2% sodium hydroxide followed by extraction with water until neutral. After drying over sodium sulfate, the product is vacuum distilled, yielding 34 g. (64%) of colorless oil boiling at 130–3°/3 mm. This product contains by analysis 38.37% chlorine.

By a similar procedure substituting the appropriate omega-polyhalogeno aliphatic halide there may be prepared other ethers of phenols with any of the aliphatic groupings listed above, as, for example, phenyl - 5,5,5 - trichloropentyl ether, phenyl-5,5-dichloro-2-pentenyl ether, and m-hydroxy-phenyl-5,5,5-trichloro-2-pentenyl ether. Phenyl ethers may also be produced according to the following example.

EXAMPLE 7

Phenyl 5,5,5-trichloro-2-pentenyl ether

To a solution of 4.6 g. of sodium dissolved in 150 cc. of absolute alcohol there is added 18.8 g. of phenol and 42 g. of 1,1,1,5-tetrachloro-3-pentene. The mixture is stirred at room temperature for 18 hours and the precipitated sodium chloride filtered off. The filtrate is added to water, the oily layer separated with ether, and the ether solution is washed with water until neutral and free of phenol. After drying over sodium sulfate, the volatile constituents are distilled off at 100°/2 mm. The residue consists of 23 g. (43%) of a fragrant oil containing by analysis 38.2% chlorine.

EXAMPLE 8

Phenyl 5,5,5-trichloropentyl sulfide

A mixture comprising 4 g. of sodium hydroxide, 100 cc. of methanol, 11 g. of thiophenol, and 30.2 g. of 5,5,5-trichloropentyliodide is refluxed with stirring for four hours. The crude product is worked up by the procedure described for Example 6. A yield of 21 g. (74%) of colorless oil distilling at 164–6°/3 mm. is obtained, which contains by analysis 11.39% sulfur as compared to the calculated value of 11.29.

By a similar procedure substituting the appropriate omega-polyhalogeno aliphatic halide there may be produced other phenyl sulfides with any of the aliphatic groupings listed above, as, for example, phenyl 7,7,7-trifluoroheptyl sulfide and phenyl 5,5-dibromo-4-pentenyl sulfide.

In place of the phenols and thiophenols of Examples 6, 7 and 8 there may be substituted other phenols and thiophenols such as resorcinol, thymol, naphthols, thionaphthols, cresols, thiocresols.

EXAMPLE 9

*5,5,5-trichloropentyl dimethyldithiocarbamate*

A mixture comprising 28.2 g. of the sodium salt of dimethyldithiocarbamic acid (containing 2.5 molecules of water), 175 cc. of butanol, and 31.5 g. of 1,1,1,5-tetrachloropentane is refluxed one hour with stirring. After cooling, the crystalline material is filtered off, washed with water to remove sodium chloride, and then recrystallized from methanol. The yield is 30 g. (68%) of white needles melting at 64-6° C. and containing by analysis 21.17% sulfur (the calculated value is 21.72).

EXAMPLE 10

*5,5,5-trichloro-2-pentenyl dimethyldithiocarbamate*

A mixture comprising 28.2 g. of sodium dimethyldithiocarbamate (containing 2.5 molecules of water), 155 cc. of methanol, and 31.5 g. of 1,1,1,5-tetrachloro-3-pentene is refluxed with stirring for two hours. The reaction mixture is poured into water, separated with ether, and the ether solution washed until neutral. After drying over sodium sulfate the solvents are removed in vacuo and the dark oil decolorized by refluxing with 150 cc. of benzene and 4 g. of Darco. After removing the solvent, the product consists of 37 g. (84%) of a light orange oil containing by analysis 21.51% sulfur as compared to the calculated value of 21.86.

By procedures similar to those outlined in Examples 9 and 10 substituting the appropriate omega-polyhalogeno aliphatic halide there may be prepared other dithiocarbamates of any of the aliphatic groupings listed above, as, for example, the diethyldithiocarbamate, dibutyldithiocarbamate, methylbutyldithiocarbamate, ethyl dithiocarbamate.

EXAMPLE 11

*S-5,5,5-trichloropentylthiopseudourea hydrochloride*

A mixture of 12 g. of thiourea, 150 cc. of ethanol, 31.5 g. of 1,1,1,5-tetrachloropentane, and 2 g. of sodium iodide is refluxed with stirring for 48 hours. At the end of this time a practically clear solution results on addition of a drop of the reaction mixture to water. The solvent is partially removed in vacuo and after cooling, the crystalline product is filtered off and twice recrystallized from ethyl acetate. The yield was 20 g. (46%) of white crystals melting at 170–172° C. The compound forms a clear solution in water which precipitates the free base on making alkaline with sodium hydroxide. The salt contains by analysis 49.80% chlorine as compared with the calculated value of 49.65.

By similar procedure substituting appropriate omega-polyhalogeno aliphatic halides there may be produced other thiopseudourea hydrohalides of any of the aliphatic groupings listed above such as the S-substituted N-methyl-, N-phenyl-, N,N'-diethyl-, and N-methyl-N-phenyl- thiopseudourea hydrohalides.

EXAMPLE 12

*2-(5,5,5-trichloro-2-pentenylthio)benzothiazole*

To a solution of 3.5 g. of sodium dissolved in 200 cc. of absolute ethanol, there is added 25.1 g. of 2-mercaptobenzothiazole and 31.2 g. of 1,1,1,5-tetrachloro-3-pentene. The mixture is refluxed with stirring for four hours, poured into water, and the oil separated with ether. The ether extract is then washed with 2% sodium hydroxide solution and finally with water until neutral. After drying over sodium sulfate, the volatile constituents are removed in vacuo (125°/3 mm.). The residue consists of 36 g. (71%) of a brown oil containing by analysis 18.90% sulfur as compared to the calculated value of 18.90.

By a similar procedure substituting the appropriate polyhalogeno aliphatic compound there may be prepared other benzothiazoles of any of the aliphatic groupings listed above such as 2-(5,5,5-trichloropentylthio)benzothiazole and 2-(9,9,9-trichlorononylthio)benzothiazole.

EXAMPLE 13

A mixture of 21 parts of 1,1,1,5-tetrachloropentane with 57 parts of formamide is refluxed for 1.5 hours. The mixture is then cooled, diluted with water, and subjected to steam distillation. The steam-volatile product is separated from the water, dried, and redistilled to obtain 9.4 parts of the formate of 1,1-dichloropentene-1-ol-5, which is a liquid boiling at 87°/7.5 mm. and having a $n_D^{25}$ of 1.4723 and a $d_4^{25}$ of 1.23.

The concurrent elimination of hydrogen chloride from the —CH$_2$CCl$_3$ group during this reaction is characteristic of the action of formamide on such a group, as set forth in my copending application, Serial No. 438,468, filed April 10, 1942.

By metathetical reactions similar to those illustrated in the example there may be prepared compounds such as 5,5,5-trichloropentyl pyridinium iodide, 5,5,5-trichloropentyl sulfide, 5,5,5-trichloropentyl trisulfide, 5,5,5-trichloropentyl xanthate, N-(5,5,5-trichloropentyl)-phthalimide, 5,5,5-trichloropentyl n-dodecyl ether, N-(9,9,9-triiodononyl)piperidine, N-(5,5,5-trichloropentylidene)phenylamine, N-(5,5-dibromo-4-pentenyl)dimethylamine, 5,5,5-trichloropentoxyethylthiocyanate ether, and 5,5,5-trichloropentylthiocyano-acetate.

From the foregoing it is evident that widely differing embodiments of the invention may be made without departing from the spirit and scope thereof and it is to be understood that the invention is not limited to any of the specific embodiments thereof but is commensurate in scope with the appended claims.

I claim:

1. Omega-polyhalogeno aliphatic compounds of the general formula

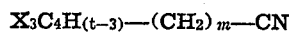
$$X_3C_4H_{(t-3)}-(CH_2)_m-CN$$

in which the terminal valencies X are satisfied by halogen, $t$ is a member of the group consisting of the integers 7 and 9, and $m$ is an integer less than 12.

2. An omega-polyhalogeno aliphatic compound of the general formula

$$X_3C-CH_2CH_2CH_2(CH_2)_mCN$$

in which the valencies X are satisfied by halogen and $m$ is a integer less than 12.

3. An omega-polyhalogeno aliphatic compound of the general formula

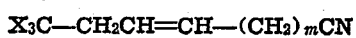
$$X_3C-CH_2CH=CH-(CH_2)_mCN$$

in which the valencies X are satisfied by halogen and $m$ is an integer less than 12.

4. An omega-polychloro aliphatic compound of the general formula $$Cl_3C-CH_2CH_2CH_2(CH_2)_mCN$$

in which $m$ is an integer less than 12.

5. An omega-polychloro aliphatic compound of the general formula $$Cl_3C-CH_2CH=CH-(CH_2)_mCN$$

in which $m$ is an integer less than 12.

ROBERT M. JOYCE, JR.

REFERENCES CITED

The following references are of record in the file of this patent:

UNITED STATES PATENTS

| Number | Name | Date |
|---|---|---|
| 2,300,291 | Jolly | Oct. 27, 1942 |
| 2,299,755 | Jolly | Oct. 27, 1942 |
| 2,316,847 | Dreyfus | Apr. 20, 1943 |
| 2,217,612 | Borglin | Oct. 8, 1940 |
| 2,057,964 | Muller | Oct. 20, 1936 |
| 2,348,321 | Benning et al. | May 9, 1944 |
| 2,336,921 | Benning et al. | Dec. 14, 1943 |

OTHER REFERENCES

Perkin et al., J. Chem. Soc. (London), vol. 91, page 828 (1907).

Fittig et al., Liebig's Annalen, vol. 161, page 314 (1872).

Krafft, Ber. Deut. Chem., vol. 10, p. 2035 (1877).

Haussknecht, Liebig's Annalen, vol. 143, page 50 (1867).

Jozitsch, Chem. Zentr., vol. 1867, I, page 1012.

Prins, Rec. Trav. Chim., vol. 56, page 780 (1937).

Albert, Ber. Deut. Chem., vol. 42, pp. 556–558 (1909).

Heilbron, Dict. of Org. Compounds, Oxford (1938), vol. 3, page 817.